United States Patent
Tanaka

(10) Patent No.: US 8,010,958 B2
(45) Date of Patent: Aug. 30, 2011

(54) DATA PROCESSING APPARATUS, PROGRAM MANAGING APPARATUS, CONTROL PROGRAM UPDATING METHOD, PROGRAM MANAGING METHOD, PROGRAM MANAGING SYSTEM, UPDATING PROGRAM, AND RECORDING MEDIUM

(75) Inventor: Yoshiaki Tanaka, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 1054 days.

(21) Appl. No.: 11/891,555

(22) Filed: Aug. 10, 2007

(65) Prior Publication Data
US 2008/0040712 A1    Feb. 14, 2008

(30) Foreign Application Priority Data
Aug. 11, 2006    (JP) .................................. 2006-219289

(51) Int. Cl.
  G06F 9/44     (2006.01)
  G06F 9/445    (2006.01)
  G06F 15/173   (2006.01)
(52) U.S. Cl. ........ 717/168; 717/120; 717/121; 717/174; 709/222; 709/223; 709/224
(58) Field of Classification Search .................. None
See application file for complete search history.

(56) References Cited

U.S. PATENT DOCUMENTS

| 7,539,747 | B2 * | 5/2009 | Lucovsky et al. | 709/224 |
| 7,555,749 | B2 * | 6/2009 | Wickham et al. | 717/168 |
| 7,627,663 | B2 * | 12/2009 | Salesky et al. | 709/223 |
| 7,673,297 | B1 * | 3/2010 | Arsenault et al. | 717/168 |
| 7,761,849 | B2 * | 7/2010 | van Woerkom et al. | 717/120 |
| 7,908,602 | B2 * | 3/2011 | Alcorn et al. | 717/174 |
| 2002/0073245 | A1 * | 6/2002 | Hallford | 709/331 |
| 2003/0033394 | A1 * | 2/2003 | Stine | 709/222 |
| 2004/0103411 | A1 * | 5/2004 | Thayer | 717/171 |

(Continued)

FOREIGN PATENT DOCUMENTS
CN    1791105    6/2006
(Continued)

OTHER PUBLICATIONS

"Integrated routing and storage for messaging applications in mobile ad hoc networks", Nain et al., Dec. 2004, pp. 595-604, <http://delivery.acm.org/10.1145/1040000/1035720/p595-nain.pdf>.*

(Continued)

*Primary Examiner* — Thuy Dao
(74) *Attorney, Agent, or Firm* — David G. Conlin; Steven M. Jensen; Edwards Angell Palmer & Dodge LLP

(57) ABSTRACT

The object is to provide a data processing apparatus, a program managing apparatus, a program managing system, etc., capable of securely and efficiently updating and managing a control program in the data processing apparatus. The data processing apparatus analyzes received data and when program updating data sent from a superior rank apparatus is acquired, temporarily stores program data for updating out of such data in a storage device. Upon occurrence of an event of a program updating request, the data processing apparatus executes updating processing based on the updating program data stored in the storage device and, after completion of the program updating, gives a notice of updating completion to the superior rank apparatus and again waits for the event. Timing of the program updating request is set later than that of the program updating data being sent from the superior rank apparatus.

2 Claims, 14 Drawing Sheets

---

ADDING/DELETING/UPDATING OF PROGRAM

| PRINTER NAME | CURRENT VERSION | PLACE OF INSTALLATION | OUTPUT ADDRESS |
|---|---|---|---|
| ☐ PRINTER A (SHARP AR-700) | 1.00 | 1ST FLOOR, SOUTH | http://192.168.150.3 |
| ☑ PRINTER B (SHARP AR-C350) | 2.00 | 1ST FLOOR, NORTH | http://192.168.150.4 |
| ☐ PRINTER C (SHARP AR-C350) | 2.00 | 1ST FLOOR, EAST | http://192.168.150.5 |
| ☐ PRINTER D (SHARP AR-700) | 1.00 | 2ND FLOOR, WEST | http://192.168.150.6 |
| ☐ PRINTER E (SHARP AR-C350) | 2.00 | 2ND FLOOR, SOUTH | http://192.168.150.7 |
| ⋮ | ⋮ | ⋮ | ⋮ |

[ ADD ]  [ DELETE ]  [ UPDATE ]  [ RETURN ]  [ CLOSE ]

U.S. PATENT DOCUMENTS

| | | |
|---|---|---|
| 2004/0148379 A1 | 7/2004 | Ogura |
| 2006/0129661 A1 | 6/2006 | Kataoka |
| 2010/0180271 A1* | 7/2010 | Arsenault et al. ............. 717/168 |

FOREIGN PATENT DOCUMENTS

| | | |
|---|---|---|
| CN | 1797327 | 7/2006 |
| JP | 09-167094 | 6/1997 |
| JP | 10-083285 | 3/1998 |
| JP | 2001-243155 | 9/2001 |
| JP | 2002-007255 | 1/2002 |
| JP | 2002-204327 | 7/2002 |
| JP | 2003-005991 | 1/2003 |
| JP | 2004-110396 | 4/2004 |
| JP | 2004-139572 | 5/2004 |
| JP | 2004-206260 | 7/2004 |

OTHER PUBLICATIONS

"A Synthesizable IP Core for DVB-S2 LDPC Code Decoding", Kienle et al., Mar. 2005, pp. 1-6, <http://delivery.acm.org/10.1145/1050000/1049342/228830100.pdf>.*

* cited by examiner

FIG.4

ADDING/DELETING/UPDATING OF PROGRAM

| PRINTER NAME | CURRENT VERSION | PLACE OF INSTALLATION | OUTPUT ADDRESS |
|---|---|---|---|
| ☐ PRINTER A (SHARP AR-700) | 1.00 | 1ST FLOOR, SOUTH | http://192.168.150.3 |
| ☑ PRINTER B (SHARP AR-C350) | 2.00 | 1ST FLOOR, NORTH | http://192.168.150.4 |
| ☐ PRINTER C (SHARP AR-C350) | 2.00 | 1ST FLOOR, EAST | http://192.168.150.5 |
| ☐ PRINTER D (SHARP AR-700) | 1.00 | 2ND FLOOR, WEST | http://192.168.150.6 |
| ☐ PRINTER E (SHARP AR-C350) | 2.00 | 2ND FLOOR, SOUTH | http://192.168.150.7 |
| ...... | ...... | ...... | ...... |

[ ADD ]  [ DELETE ]  [ UPDATE ]  [ RETURN ]  [ CLOSE ]

FIG.6

| | DELETING OF PROGRAM | |
|---|---|---|
| PRINTER B(SHARP AR-C350)1ST FLOOR, NORTH | | |

| VERSION | RETENTION PERIOD | UPDATING DATE/HOUR |
|---|---|---|
| ☑ 1.00 | NOT SPECIFIED | 2005/1/1 0:00 |
| ☐ 1.20 | 2007/11/31 | 2005/10/1 22:00 |
| 2.00 | 2008/3/31 | 2006/3/1 12:00 |

OK  CANCEL

FIG.8

| JOB START IDENTIFIER |
| --- |
| JOB TYPE |
| PROGRAM VERSION |
| PROGRAM FILE NAME |
| PROGRAM RETENTION PERIOD |
| PROGRAM UPDATING DATE/HOUR |
| PROGRAM UPDATING TIME LIMIT |
| LIST OF PROGRAM TRANSFERRING ADDRESSES (TRANSFERRING ADDRESS, UPDATING DATE/HOUR, UPDATING TIME LIMIT) |
| DATA SIZE |
| PROGRAM DATA |
| JOB END IDENTIFIER |

DATA PROCESSING APPARATUS, PROGRAM MANAGING APPARATUS, CONTROL PROGRAM UPDATING METHOD, PROGRAM MANAGING METHOD, PROGRAM MANAGING SYSTEM, UPDATING PROGRAM, AND RECORDING MEDIUM

CROSS-NOTING PARAGRAPH

This Non-provisional application claims priority under 35 U.S.C. §119 (a) on Patent Application No. 2006-219289 filed in JAPAN on Aug. 11, 2006, the entire contents of which are hereby incorporated herein by reference.

FIELD OF THE INVENTION

The present invention relates generally to a data processing apparatus, a program managing apparatus, a control program updating method, a program managing method, a program managing system, an updating program, and a recording medium, and more particularly, to management of updating of a control program in a data processing apparatus having a storage device.

BACKGROUND OF THE INVENTION

A digital multi-function peripheral, as an example of a data processing apparatus, has a plurality of functions such as a printer function, a scanner function, a copier function, and a fax function, and program data, etc., of firmware or software for controlling these functions are stored in a storage means such as a flash memory. When it becomes necessary to enhance or change the function, a serviceman, etc., replaces an old functional board with a new one or performs a job of rewriting the program data.

With respect to such kind of job, for example, Japanese Laid-Open Patent Publication No. H09-167094 discloses a data processing apparatus, etc., capable of adding or changing the function efficiently at a predetermined timing.

Japanese Laid-Open Patent Publication No. 2001-243155 discloses a network managing apparatus, etc., that manages a program of each device connected to a network and has the program updated as required.

Further, Japanese Laid-Open Patent Publication No. 2004-110396 discloses a printer managing system, etc., that, at the time of updating firmware of a printer, enables automatically updating a plurality of pieces of firmware together.

However, in such conventional technologies as described above, a program is acquired from the outside only after the time has come for updating the program and therefore, in the case of acquiring an updating program from a managing server by way of the network, there are cases in which the program can not be supplied or acquired at the time of updating the program, depending on the condition of the managing server, the condition of the network, and the condition of the data processing apparatus, for example, a large quantity of data being processed or power not being turned on. The conventional technologies have no mechanism for keeping an old version of the program and therefore, once the program is updated with the latest program, the previous program must be reacquired as a latest program in the case of bringing the program back to the previous program.

SUMMARY OF THE INVENTION

It is therefore the object of the present invention to provide a data processing apparatus, a program managing apparatus, a program managing system, a program managing method, a data processing program, a program managing program, and a recording medium, capable of securely and efficiently updating and managing a control program in the data processing apparatus.

A first technical means is a data processing apparatus having a storage device, comprising: a data sending/receiving unit that receives data including program updating data for updating a control program of the apparatus; and a program updating unit that manages the program updating data and updates the control program of the apparatus based on the program updating data, wherein the program updating unit comprises: an updating data acquiring unit that acquires the program updating data addressed to the apparatus out of the received data received by the data sending/receiving unit; a retaining unit that has the acquired program updating data retained by the storage device; and an updating timing determining unit that determines updating timing, wherein the control program of the apparatus is updated by the program updating data retained by the storage device at the updating timing determined by the updating timing determining unit.

A second technical means is the data processing apparatus as defined in the first technical means, wherein the updating timing determining unit determines the updating timing based on updating timing conditions contained in updating-related information in the program updating data.

A third technical means is the data processing apparatus as defined in the second technical means, wherein the updating timing conditions are conditions utilizing operating state of the data processing apparatus.

A fourth technical means is the data processing apparatus as defined in the third technical means, wherein the operating state is the state immediately before the data processing apparatus moves to a sleep mode.

A fifth technical means is the data processing apparatus as defined in the first technical means, wherein the program updating unit has a function of storing past program data used before the updating of the program in relation to the updating-related information, in the storage device.

A sixth technical means is the data processing apparatus as defined in the first technical means, having a function of returning the control program to the program before update stored in the storage device, when a trouble is occurred in an updated control program.

A seventh technical means is the data processing apparatus as defined in the first technical means, wherein the program updating unit has a function of updating the control program of the apparatus to a specified version of the program, using the program stored in the storage device according to the instruction from a superior rank apparatus.

An eighth technical means is the data processing apparatus as defined in the first technical means, wherein the program updating unit has a function of transferring the program updating data stored in the storage device to other data processing apparatus.

A ninth technical means is the data processing apparatus as defined in the first technical means, wherein the program updating unit has a function of notifying the superior rank apparatus of completion of updating of the control program.

A tenth technical means is the data processing apparatus as defined in the first technical means, wherein the program updating unit has a function of sending information on the program storage in the storage device according to a request from the superior rank apparatus.

An eleventh technical means is the data processing apparatus as defined in the first technical means, wherein the program updating unit has a function of destroying acquired program updating data when the acquired program updating data is the same as the program updating data stored in the storage device.

A twelfth technical means is the data processing apparatus as defined in the first technical means, wherein the program updating unit has a function of deleting the program stored in the storage device.

A thirteenth technical means is the data processing apparatus as defined in the twelfth technical means, wherein the deletion of the program stored in the storage device is executed based on the program retention period information contained in the updating-related information.

A fourteenth technical means is the data processing apparatus as defined in the twelfth technical means, wherein the deletion of the program stored in the storage device is executed according to a request from the superior apparatus.

A fifteenth technical means is the data processing apparatus as defined in any one of the first to fourth technical means, wherein the program updating unit has a function of comparing program data size information contained in the updating-related information with free space information of the storage device and, in the case of insufficient free space of the storage device, deleting firstly the program whose expiring date of retention comes earliest based on the program retention period information, at the time of acquiring the program updating data from the superior rank apparatus.

A sixteenth technical means is a program managing apparatus that manages a control program of a data processing apparatus by way of a network, comprising: a data sending/receiving unit; and a program managing unit that manages the control program of the data processing apparatus, wherein the program managing unit generates program updating data including updating-related information of the control program and sends thus generated program updating data to the data processing apparatus by way of the data sending/receiving unit before a timing comes for updating the program in the data processing apparatus.

A seventeenth technical means is the program managing apparatus as defined in the sixteenth technical means, wherein the program managing unit has a function of setting different updating timing conditions contained in the updating-related information for respective data processing apparatuses.

An eighteenth technical means is the program managing apparatus as defined in the sixteenth technical means, wherein the program managing unit has a function of setting a program updatable period as one of the updating-related information.

A nineteenth technical means is the program managing apparatus as defined in the eighteenth technical means, wherein the program updatable period is a period when the data processing apparatus is in a non-operational state without the power off.

A twentieth technical means is the program managing apparatus as defined in the sixteenth technical means, wherein the program managing unit has a function of sending a command to change the program updating timing conditions already set in the data processing apparatus.

A twenty-first technical means is the program managing apparatus as defined in the sixteenth technical means, wherein the program managing unit has a function of acquiring program storage information from the data processing apparatus and not sending out program updating data to the data processing apparatus that already retains the same program updating data.

A twenty-second technical means is the program managing apparatus as defined in the sixteenth technical means, wherein the program managing unit has a function of acquiring program storage information from the data processing apparatus and sending a deleting command to delete the program stored in the storage device of the data processing apparatus based on thus acquired information.

A twenty-third technical means is a control program updating method in a data processing apparatus having a storage device, comprising steps of: receiving data containing program updating data; taking the program updating data out of the received data; storing the program updating data in the storage device; and updating the control program of the apparatus at a predetermined updating timing based on the program updating data stored in the storage device.

A twenty-fourth technical means is the control program updating method as defined in the twenty-third technical means, wherein conditions determining the updating timing are set in a storage unit of the data processing apparatus.

A twenty-fifth technical means is the control program updating method as defined in the twenty-third technical means, wherein the conditions determining the updating timing are contained in updating-related information in the program updating data.

A twenty-sixth technical means is a program managing method for managing a control program of a data processing apparatus by way of a network, comprising steps of: acquiring an updating program file from the outside; generating program updating data including updating-related information for the data processing apparatus based on the acquired program file; and sending the generated program updating data to the data processing apparatus before a program updating timing in the data processing apparatus comes.

A twenty-seventh technical means is the program managing method as defined in the twenty-sixth technical means, wherein the updating timing contained in the updating-related information is different for respective data processing apparatuses.

A twenty-eighth technical means is a program managing system, wherein the data processing apparatus as defined in the first technical means and the program managing apparatus as defined in the sixteenth technical means are connected by way of a network.

A twenty-ninth technical means is the program managing system as defined in the twenty-eighth technical means, wherein the updating-related information contains information on updating time limit of the program, and the program managing apparatus has a function of separately sending an updating command to the data processing apparatus that does not send an updating completion notice even after the updating time limit has passed.

A thirtieth technical means is the program managing system as defined in the twenty-eighth technical means, wherein the program managing apparatus has a function of sending a command to return the control program to the program before update stored in the storage device of the data processing apparatus to the data processing apparatus that has a trouble in the updated control program.

A thirty-first technical means is the program managing system as defined in the twenty-eighth technical means, wherein the program managing apparatus has a function of managing a version of a printer driver incorporated in a personal computer connected to the network and sending an updating command to update the control program to the corresponding data processing apparatus according to a latest version of updating program data stored in the storage device at the timing when the versions of printer drivers in all personal computers are changed to the latest ones.

A thirty-second technical means is the program managing system as defined in the thirty-first technical means, wherein the updating command is sequentially sent to a plurality of corresponding data processing apparatuses, at a predetermined interval.

A thirty-third technical means is a program for the control program updating method as defined in any one of the twenty-third to twenty-fifth technical means that is executed by a computer.

A thirty-fourth technical means is a program for the program managing method as defined in the twenty-sixth or twenty-seventh technical means that is executed by a computer.

A thirty-fifth technical means is a computer-readable recording medium that records the program as defined in the thirty-third technical means.

A thirty-sixth technical means is a computer-readable recording medium that records the program as defined in the thirty-fourth technical means.

BRIEF DESCRIPTION OF THE DRAWINGS

FIG. 4 is a diagram of a screen display example at the time of selecting a printer and a job in a program managing apparatus;

FIG. 6 is a diagram of a display example of "deletion of program" screen in the program managing apparatus;

FIG. 8 is a diagram of a data composition example of program updating data;

PREFERRED EMBODIMENTS OF THE INVENTION

Embodiments of the present invention are described below taking a printer as an example of a data processing apparatus.

Figure 1:
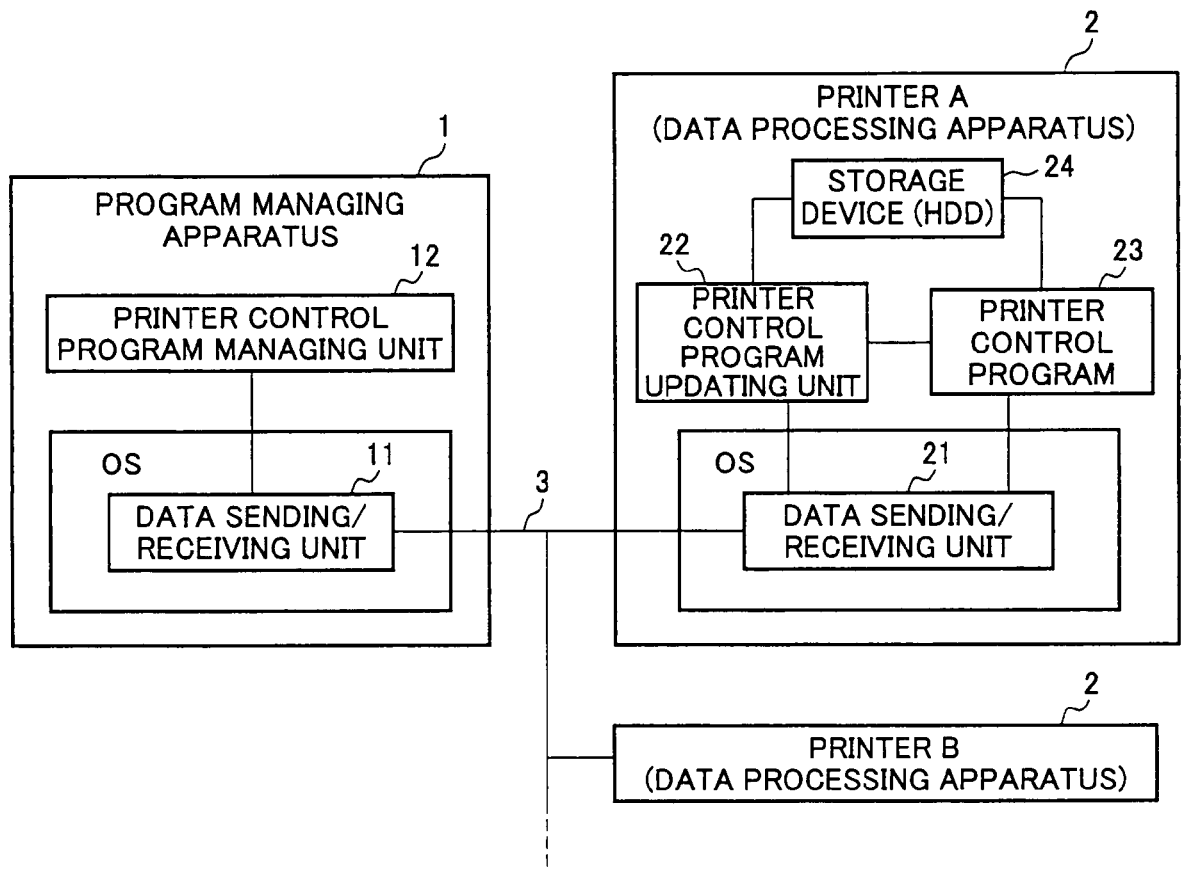
FIG. 1 is a schematic configuration diagram of a program managing system as a whole in embodiments of the present invention.

FIG. 1 is a schematic configuration diagram of a program managing system as a whole in which a program managing apparatus 1 and a printer (data processing apparatus) 2 having a data sending/receiving function and a storage device as a data processing apparatus are connected through a network 3. The program managing apparatus 1 comprises a data sending/receiving unit 11 and a printer control program managing unit 12 that manages a control program for the printer 2 and the printer 2 comprises a data sending/receiving unit 21, a printer control program updating unit 22, a printer control program 23, and a storage device 24.

Figure 2:
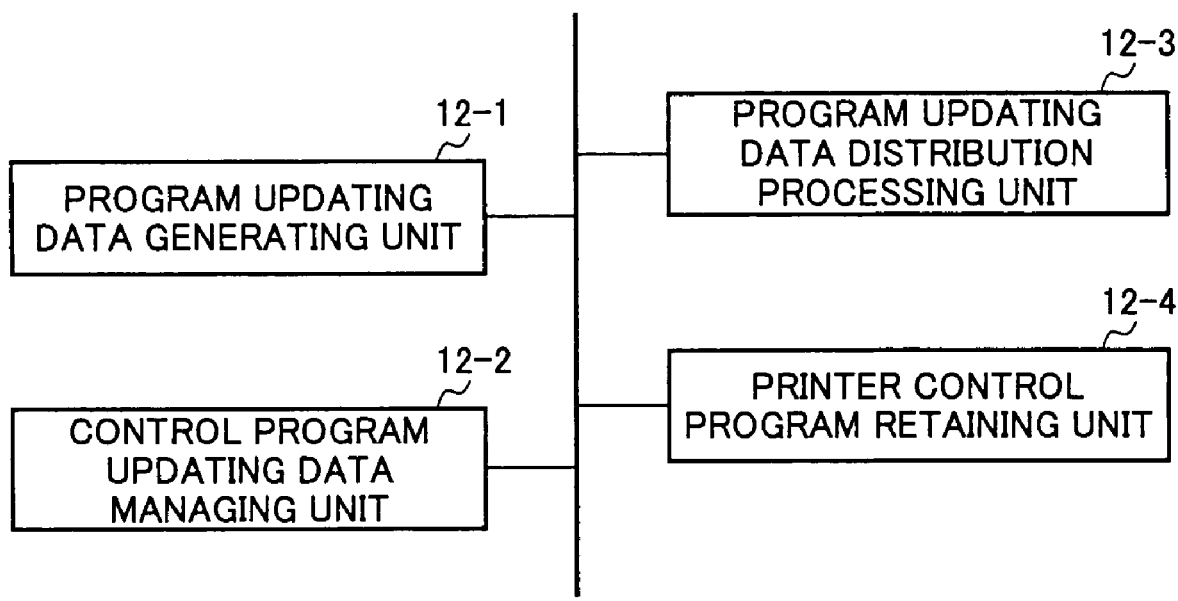
FIG. 2 is a module configuration diagram of a printer control program managing unit of FIG. 1.

FIG. 2 shows a module configuration of the printer control program managing unit 12, which comprises a program updating data generating unit 12-1, an updating data managing unit 12-2 for the printer control program 23, a program updating data distribution processing unit 12-3, and a printer control program retaining unit 12-4.

Figure 3:
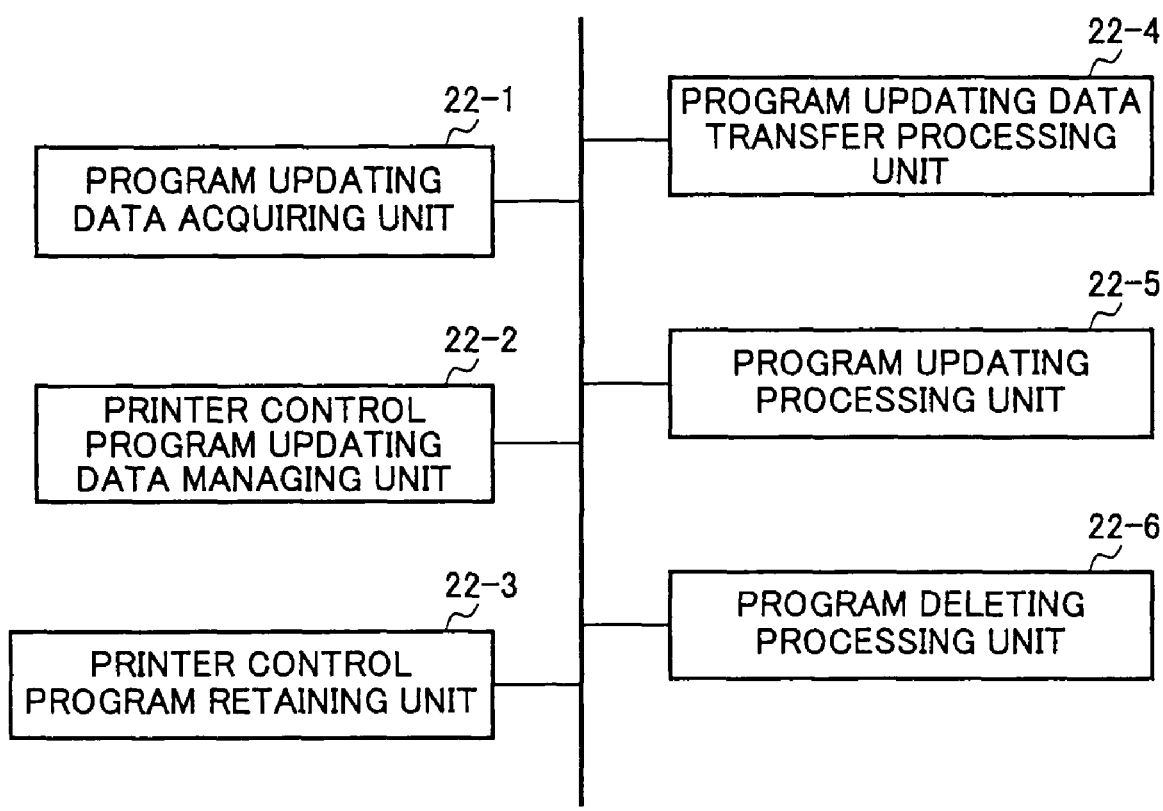
FIG. 3 is a module configuration diagram of a printer control program updating unit of FIG. 1.

FIG. 3 shows a module configuration of the printer control program updating unit 22 of the printer 2. The printer control program updating unit 22 comprises a program updating data acquiring unit 22-1, an updating data managing unit 22-2 for the printer control program 23, a printer control program retaining unit 22-3, a program updating data transfer processing unit 22-4, a program updating processing unit 22-5, and a program deleting processing unit 22-6.

Next, the program managing apparatus 1 according to the present embodiments is explained based on a screen display example of each processing.

FIG. 4 shows a screen display example in the case of adding, deleting or updating the control program of the printer 2 connected to the network in the program managing apparatus 1. The items displayed on the screen are a list of a printer name, current version information, a place of installation, an IP address as an output destination, etc., of printers connected to the network, together with buttons for selecting "add", "delete", and "update" jobs.

On this display screen, by pointing a cursor (not shown) to, and checking, the name of the printer for which processing is required and by clicking the "add", "delete", or "update" button, the screen changes to the screen for processing of the selected job. Here, description is made of contents of the "add", "delete", and "update" jobs on the part of the program managing apparatus. The "add" job is the processing for sending to a corresponding printer a latest version of the program file for the so-called major version-up that is updating a current version of the control program as a whole to a new version of the program by exchanging entire files. The "delete" job is the processing of deleting such an old version of the program stored in the storage device 24 of the printer that is no longer required from the storage device 24. The "update" job is the processing of supplying to the printer an updating data file for the so-called minor version-up that is making a partial change or modification to a current control program and includes the processing related to changes of updating conditions, etc.

Since the updating of the control program is executed for each printer of the same model number, it is more efficient to select the printer according to the model number of the printer when a large number of printers are involved.

Figure 5A:
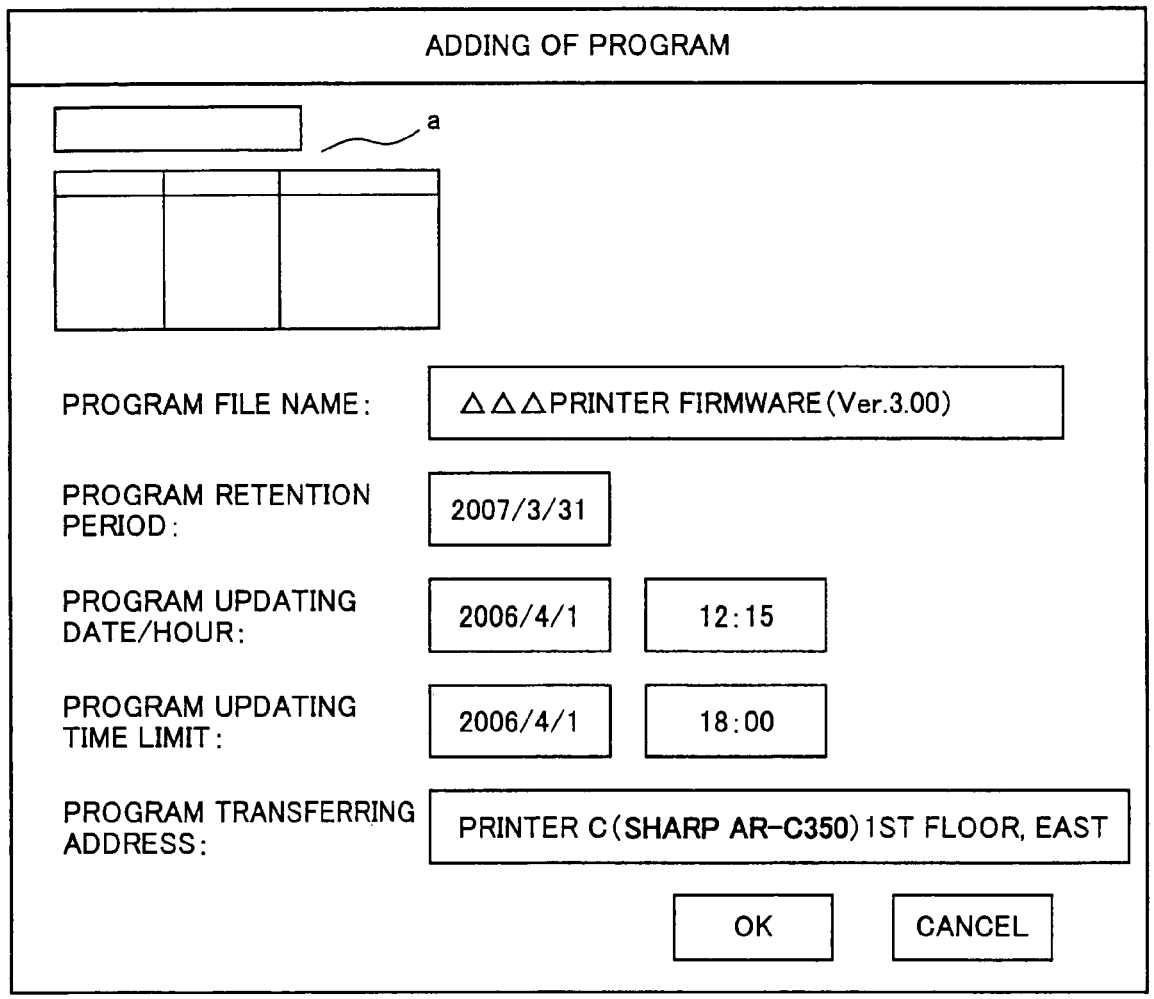
FIGS. 5A and 5B are diagrams of a display example of "addition of program" screen in the program managing apparatus.

FIG. 5A shows the screen in the case of performing the "add" job, which is displayed by selecting one printer and clicking the "add" button on the screen of FIG. 4. On this screen, as shown in FIG. 5A, a manager inputs the name of the program file including the control program of the selected printer whose file is updated to a new version (for example, ΔΔΔ PRINTER FIRMWARE (Ver.3.00)), an updating (retention) period (for example, 2007/3/31), its updating date/hour (for example, 2006/4/1, 12:15), its updating time limit (for example, 2006/4/1, 18:00), and the address (for example, PRINTER C (SHARP AR-C350) 1ST FLOOR, EAST) where the new version of the program file is transferred. Since the latest version of the program file for updating which is provided by the manufacturer on the web site or by other means is already stored in the storage device of the program managing apparatus and the program file name, etc., is included in the program information thereof, and therefore, the new program can be automatically input using that information. With respect to the transferring address of the program, etc., that is described later, the contents which are currently set by default can be automatically input.

Figure 5B:
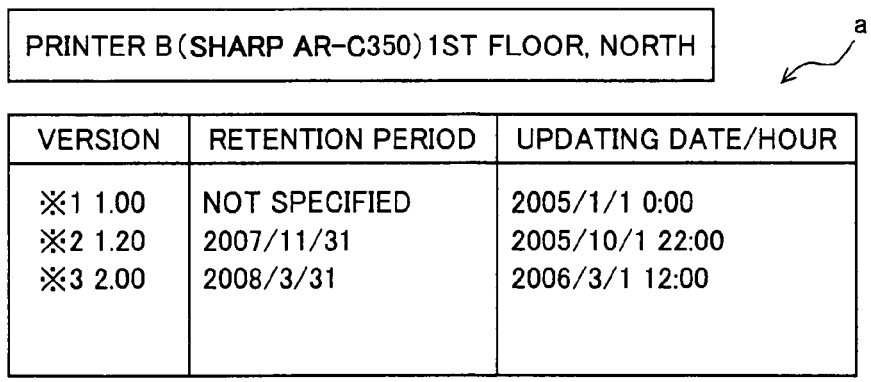

The present embodiments are designed to display, at the upper left part a of the screen of FIG. 5A, the information regarding the selected printer, such as the name and place of installation of the printer, the version information (*3) of the current program and its updating period and updating date/hour, and the version information (*1, *2) and updating history information of the control programs stored in the storage device 24 of the printer, as shown in FIG. 5B. This enables the manager to input parameters such as updating conditions, referring to the printer information.

While the same thing can be said for the "delete" and "update" processing that is described later, it may be so arranged that when a large number of printers to be managed are connected to the network, the printer selection on the screen of FIG. 4 is made in such manner that all printers of the same model number are collectively selected by specifying the model number of the printer and after the clicking of the "add" button, all parameters such as the program file, the updating timing conditions, the updating time limit, and the retention period is automatically input.

If all updating timings are set at the identical time, all updating processing simultaneously starts at such time and no printer is available for use in the meantime. To avoid such a situation, it is also possible to design so that, for example, a plurality of printers installed on the same floor have their updating timings set with a predetermined interval provided from one printer to another. Same thing can be said of the updating timing at the address to which the program is transferred. Namely, printers at least on the same floor, including the selected printer and the printers at the transferring address, are set so as not to simultaneously execute the updating processing at the same timing.

It is also possible to set a combination of conditions such as a predetermined day of the week and a time or a predetermined day of the week and an operating state of apparatus (for example, immediately before shifting to a sleep mode, etc.) as the conditions for determining the updating timing.

FIG. 6 shows an example of a display screen for deleting from the storage device 24 the program that is no longer required to be stored out of the versions of programs possessed by the printer and this screen is displayed by selecting the printer to be aimed and clicking the "delete" button on the screen of FIG. 4. By checking the version to be deleted and clicking the "OK" button, a delete command is sent to the corresponding printer. The version 2.00 is designed not to be checked so that the current version may not be selected erroneously.

Figure 7:
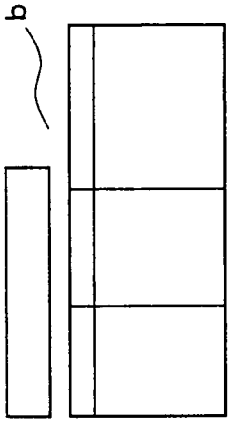
FIG. 7 is a diagram of a display example of "updating of program" screen in the program managing apparatus.

FIG. 7 shows an example of a display screen in the case of rewriting a part of the program, the so-called minor version-up, or changing the updating conditions and this screen is displayed by selecting a printer to be aimed and clicking the "update" button on the screen of FIG. 4. In this case as well, the updating data is already stored in the program managing apparatus and, by specifying the printer, the updating data file name is automatically input to an input region of the program file name. The updating conditions set for the current version of the program are displayed at the left-hand side of the input region of the updating conditions. When changes with respect to the retention period, the updating date/hour, the updating time limit, and the transferring address of the program are input to corresponding locations of the right-hand space for changes and the "OK" button is clicked, the program updating data specified by the program file name and the information on the changes input to the right-hand space are sent to the corresponding printer.

It may be so arranged that the updating history information of FIG. 5B can be displayed at the upper left part b of the screen, in the same way as in the case of the "add" job.

FIG. 8 shows contents of the program updating data to be sent to the printer apparatus.

Next, a processing flow at the printer control program updating unit 22 of the printer 2 is explained based on a flow chart.

Figure 9:
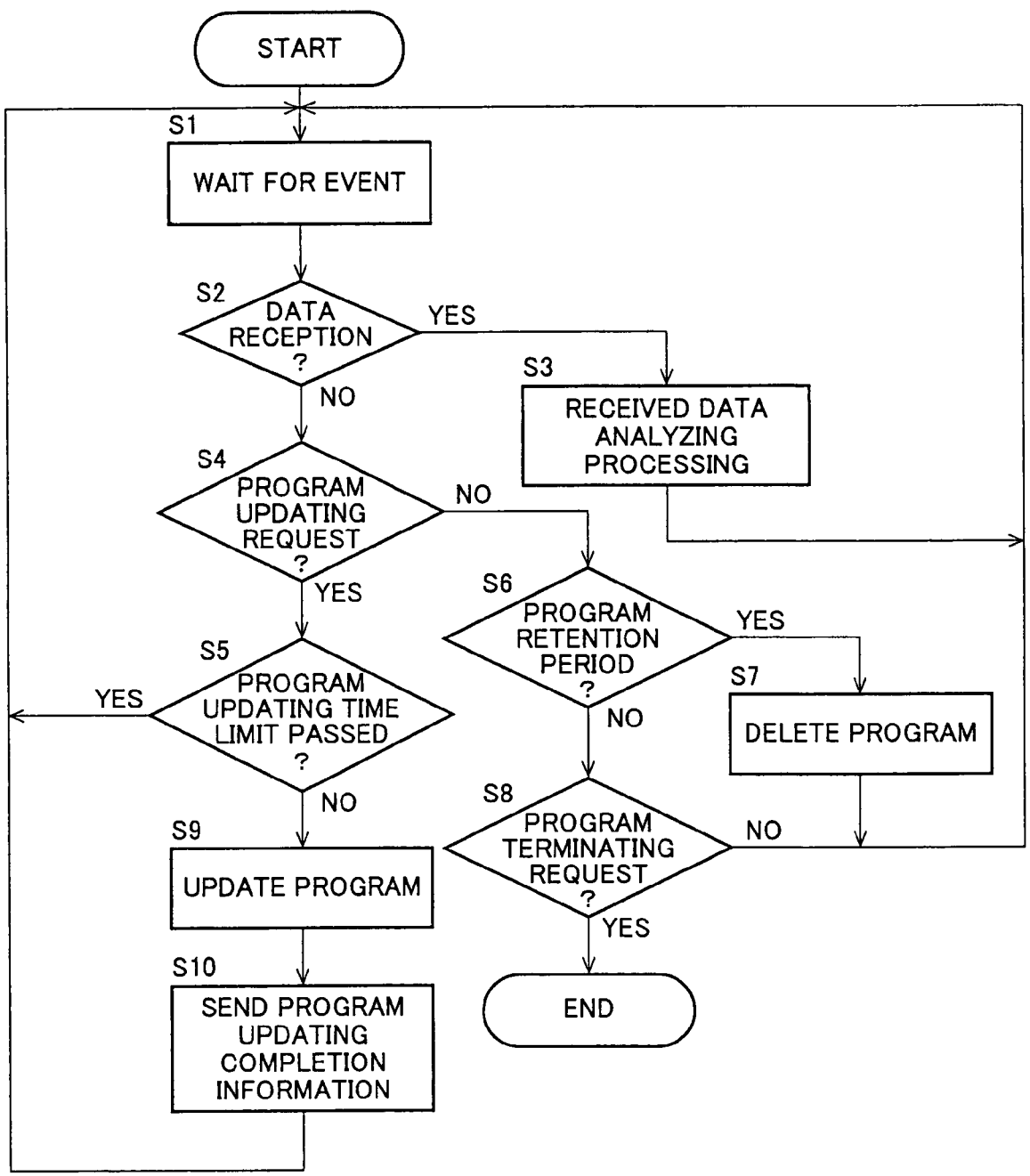
FIG. 9 is a flow chart of main processing in a printer control program updating unit.

FIG. 9 shows a flow chart of main processing of the printer control program updating unit 22.

The following description is based on the premise that the program data for updating and the updating-related information such as updating timing determining conditions, the updating time limit, and the retention period have already been sent from the program managing apparatus 1 to the printer apparatus 2. The "update" job in the printer control program updating unit (hereinafter, "program updating unit") includes both of the major version-up by the new-version program file in the "add" job and the minor version-up that makes a partial change or modification to the current control program, described in the program managing apparatus.

If any event occurs at step S1, judgment is made, at step S2, of whether it is data reception and if it is the data reception, then the process goes to step S3 for execution of received data analyzing processing that is described later and after the execution, goes back to the event-waiting. If the event that occurred is not the data reception, then the process goes to step S4, and if it is a program updating request due to arrival of the program updating timing, then the process goes to step S5. If the event that occurred is due to expiration of program retention period, then the process goes from step S6 to step S7 and the processing of deleting the corresponding program is executed and the process goes back to step S1.

At step S5, if it is the program updating request, but the updating time limit has already passed, then the process goes back to step S1, without executing the program updating processing.

If the program updating request is made before the updating time limit, then the program updating processing is executed at step S9, program updating completion information is sent to the program managing unit 1 at step 10, and the process goes back to step S1.

At step S1, if the event is a program finishing request, then the process goes to step S8 and the process is finished.

With respect to an automatic deletion of the program, it may be so arranged that the conditions other than the retention period are set, for example, an upper limit is set to the number of programs to be kept and if this limit is exceeded, the oldest program is deleted.

While this is not indicated in FIG. 9, it may be so arranged that, for example, even if the time has come for the program updating and the event of the program updating request has occurred, the process passes over step S10 and goes back to step S1 when the program updating data has not been sent from a superior rank apparatus.

Furthermore, it may be so arranged that in such a case in which the program updating has not been completed normally, the process shifts to the program for returning to the previous version of the program due to an interruption and a notice is given to the superior rank apparatus that the updating has not been completed normally. Or it may be so arranged that a signal of such a state is output to a main control unit which is in charge of the control of the apparatus as a whole (multi-function peripheral) and the main control unit notifies the program managing unit of such information.

Figure 10:
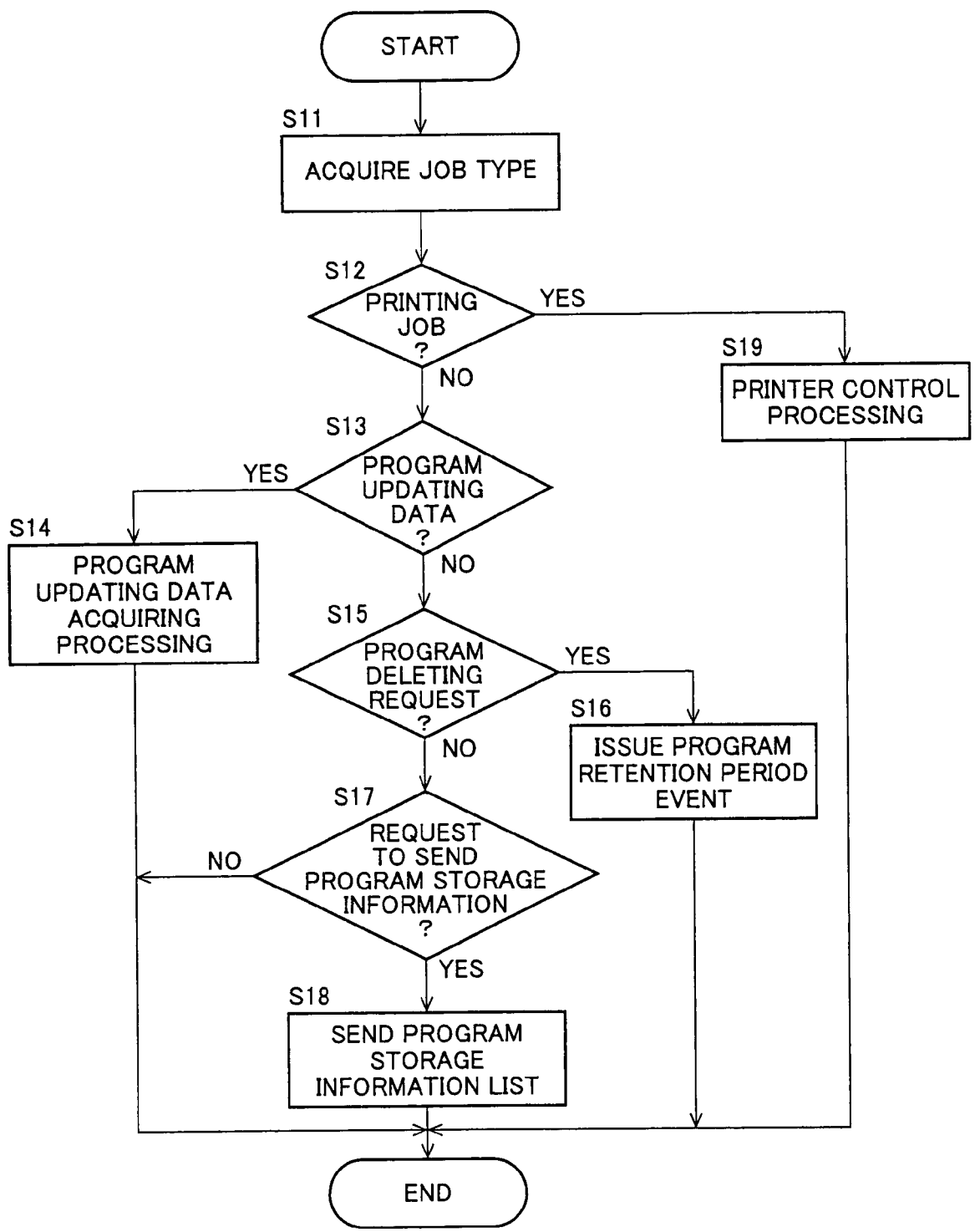
FIG. 10 is a flow chart of received data analyzing processing in FIG. 9.

FIG. 10 shows a flow chart of the received data analyzing processing at step S3 of FIG. 9. At step S11, the job type is acquired and if the job is a printing job, then the process goes to step S19, the control processing for the normal printer printing is executed, and the process ends.

At step S11, if the job is the program updating data, then the process goes from step S13 to step S14, program updating data acquiring processing that is described later is executed, and the process ends.

If the job is a program deleting request, then the process goes from step S15 to step S16, a program retention period event is issued, and the process ends.

If the job is a request to send program storage information from the program managing apparatus 1, then the process goes from step S17 to step S18, a list of the program storage information is sent to the program managing apparatus 1, and the process ends.

Figure 11:
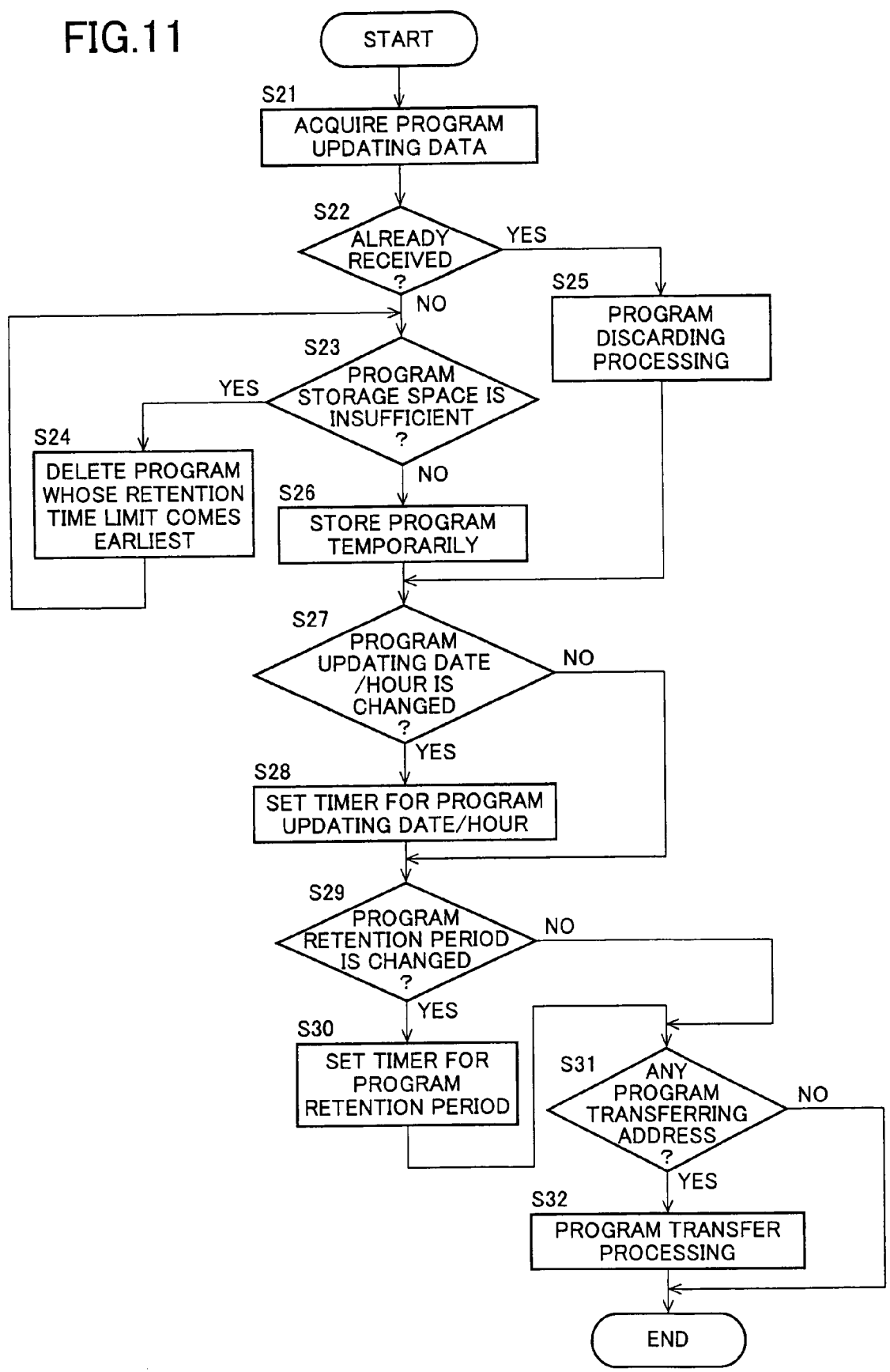
FIG. 11 is a flow chart of program updating data acquiring processing in FIG. 10.

FIG. 11 shows a flow chart of the program updating data acquiring processing mentioned above. At step S21, the program updating data is acquired and then the process goes to step S22 and if thus acquired data is not the data already received, then the process goes to step S23 and judgment is made of whether a program storage area is insufficient for storing the program in the storage device, based on the information on the data size of the program.

If the storage area is insufficient, then at step S24, the program whose retention period expires earliest is deleted.

If the received program updating data is the data already acquired, then at step S25, program discarding processing is executed and the process goes to step S27.

At step S23, if the storage area can be secured for storing the updating program, then the process goes to step S26 and the acquired program is temporarily stored in the storage device.

At step S27, if the program updating date/hour is changed in the updating-related information contained in the program updating data received this time, then at step S28, a timer is set at the specified program updating date/hour, and if the program retention period is changed at step S29, then a timer is set at the specified program retention period at step S30.

Furthermore, if a transferring address of the program is specified in the updating-related information at step S31, then program transferring processing is executed at step S32 and the program updating data acquiring processing is finished.

Figure 12:
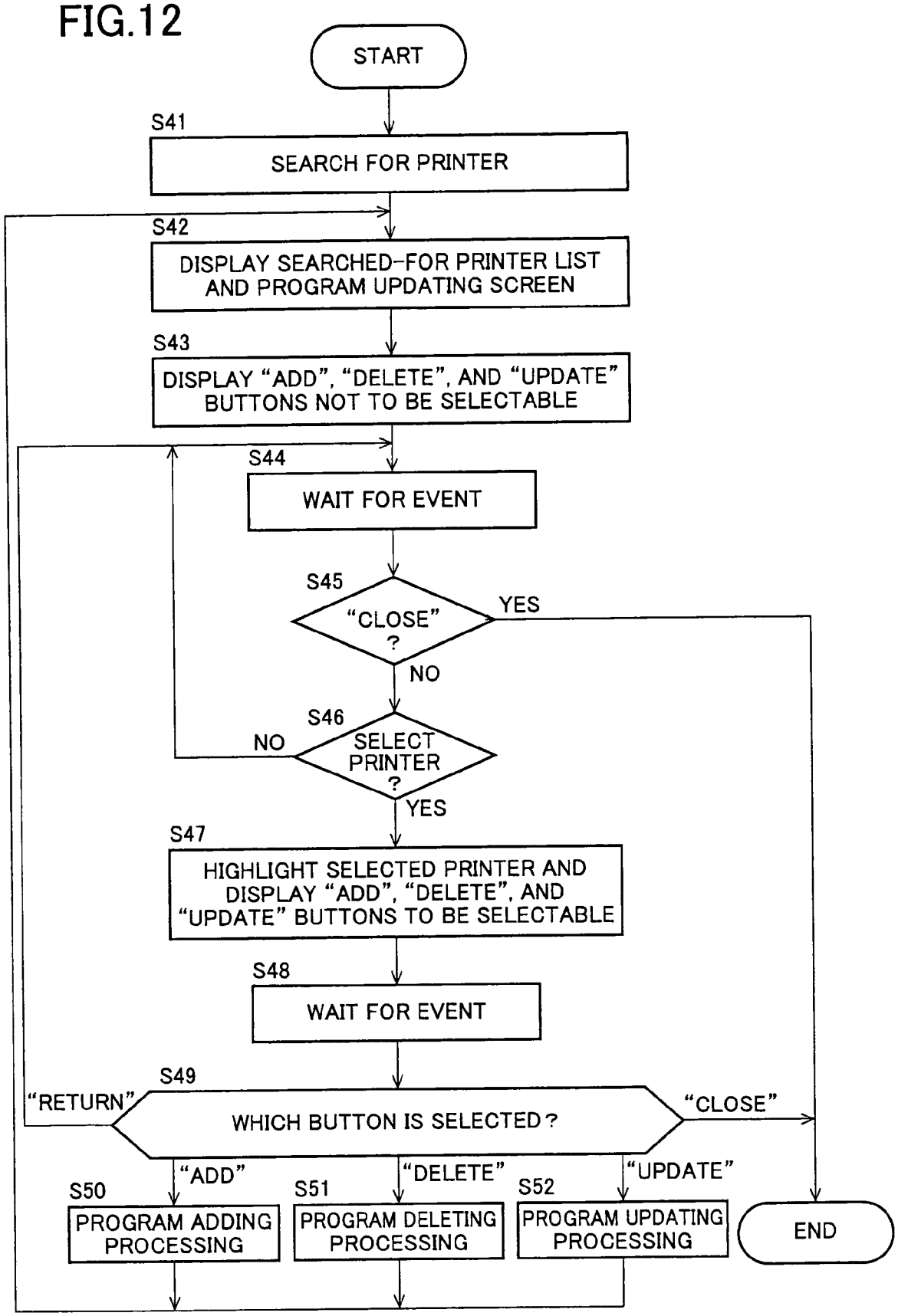
FIG. 12 is a flow chart of start-up screen processing in the program managing apparatus.

FIG. 12 shows a flow chart of processing of the screen of the printer selection and the job selection in the printer control program managing unit 12 shown in FIG. 4.

At step S41, a search is made for printers connected to the network and at step S42, a printer information list of searched-for printers is displayed and at step S43, the "add", "delete" and "update" buttons are displayed not to be selectable and at step S44, the process goes to the event-waiting mode.

Here, if the "close" button is selected without selecting a printer, then the process goes from step S45 to "end".

In the event-waiting at step S44, if the printer selection is made, then the process goes from step S46 to step S47 and the selected printer is highlighted and the "add", "delete" and "update" buttons are displayed to be selectable and the process goes to the event-waiting at step S48.

If the "add" button is selected on the screen of FIG. 4, then the process goes from step S49 to step S50, the program adding processing screen of FIGS. 5A and 5B is displayed, and the program adding processing can be executed. If the program adding processing is finished, then the process goes back to step S42 and the screen of FIG. 4 is displayed again. At step S43, the "add", "delete" and "update" buttons are displayed not to be selectable and at step S44, the process goes to the event-waiting again.

If the "delete" button is selected on the screen of FIG. 4, then the process goes from the step S49 to step S51, the program deleting processing screen of FIG. 6 is displayed, and the program deleting processing can be executed. If the "update" button is selected on the screen of FIG. 4, then the process goes from the step S49 to step S52, the program updating processing screen of FIG. 7 is displayed, and the program updating processing can be executed. After the processing is finished, in the same way as in the case of "add", the process goes back to step S42 and the screen of FIG. 4 is displayed. At step S43, the "add", "delete" and "update" buttons are displayed not to be selectable and at step S44, the process goes to the event-waiting again.

In the case of making the printer selection over again, by clicking a "return" button at step S49, the process goes to step S44, waiting for the even of printer selection. In this case, while this is not shown in the flow chart, the highlighted display of the printer is changed back to the ordinary display and the job buttons are displayed not to be selectable.

Figure 13:
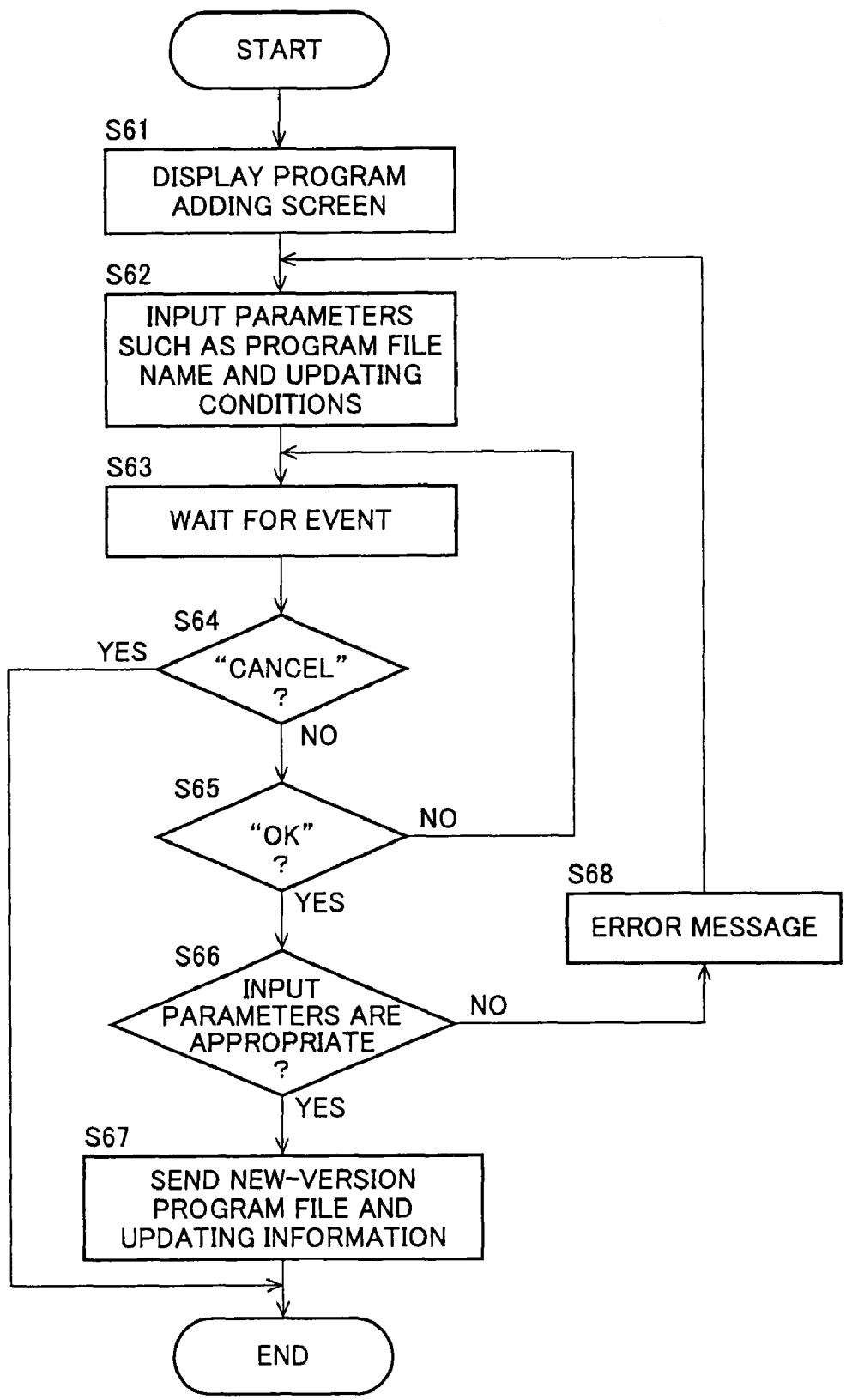
FIG. 13 is a flow chart of "addition of program" screen processing in the program managing apparatus.

FIG. 13 is a flow chart of screen processing of "program adding processing" at step S50 of the flow chart of FIG. 12.

At step S61, the screen of FIGS. 5A and 5B is displayed and when the updating program file name and parameters in the updating-related information described above are input at step S62, the process goes to the event-waiting at step S63. Here, if the "cancel" button is clicked, then the process goes from step S64 to the end. If necessary parameters are input and the "OK" button is clicked, then the process goes from step S65 to step S66 and if the input parameters are appropriate, then the process goes to step S67, thus added new version of program file and the program updating data including the updating-related information are sent to the corresponding printer and the program adding processing is finished.

If the input parameters are inappropriate, then the process goes from step S66 to step S68, an error message is displayed, and the process goes back to step S62.

Figure 14:
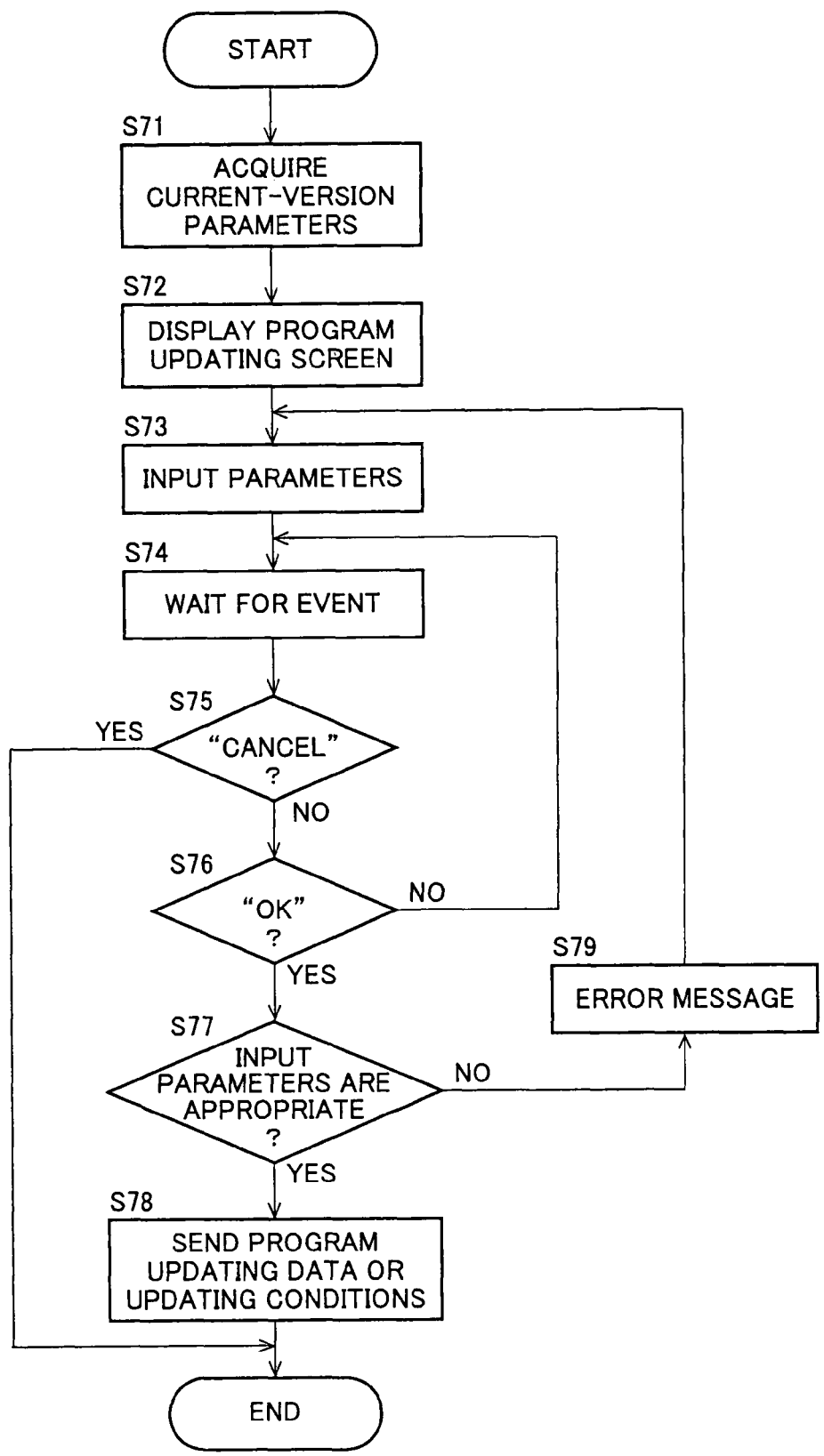
FIG. 14 is a flow chart of "updating of program" screen processing in the program managing apparatus.

FIG. 14 is a flow chart of screen processing of "program updating processing" at step S52 of the flow chart of FIG. 12.

At step S71, parameters such as the program file name and updating conditions of the current version are acquired and at step S72, the screen of FIG. 7 described above is displayed and at step S73, if the updating conditions are input, then at step S74, the process goes to the event-waiting. Here, if the "cancel" button is clicked, then the process goes from step S75 to the end. If necessary parameters are input and the "OK" button is clicked, then the process goes from step S76 to step S77 and if the input parameters are appropriate, then the process goes to step S78 and the program updating data or the updating data composed only of changed updating conditions is sent to a corresponding printer and the program updating processing is finished.

If the input parameters are inappropriate, then the process goes from step S77 to step S79, the error message is displayed, and the process goes back to step S73 and waits for parameters to be re-input.

This updating processing enables not only the version-up by new updating data but also the version-down of returning the printer control program from the current version to the previous version stored in the storage device. Namely, since a plurality of control programs stored in the storage device of the printer are also managed by the program managing apparatus in relation to the updating-related information, it can be dealt with the situation in which it becomes necessary to return the control program to the previous version, for example, in view of the usage situation of versions of printer drivers installed in each personal computer.

With respect to the control program updating timing in the data processing apparatus, the "date/hour" mentioned above is only one example of such timing and other than the date/hour, operating situation, etc., of the data processing apparatus may be used as such timing. For example, in recent years, from the point of the energy saving, the printer is often designed to shift to a sleep mode when it does not receive any printing data from personal computers for a specified period and therefore, the state of the printer immediately before entering the sleep mode may be used as the updating timing conditions. In the case of the embodiments described above in which the example of the "date/hour" is shown as the updating timing, the step S27 and step S28 in the flow chart of FIG. 11 correspond to the updating timing determining means.

It may be so arranged that an updating command is issued from the program managing apparatus to all personal computers when the printer drivers are changed to a predetermined version by using the information on the management of versions of printer drivers in personal computers that is performed by the program managing apparatus. This is an effective program updating method in the case in which a new function does not work unless both of the printer program and the printer driver in the personal computer are updated.

Furthermore, the following embodiments can be achieved with respect to the present invention.

Namely, the program managing apparatus can be designed to have the function of separately sending an updating command to the data processing apparatus that does not send an updating completion notice even after the updating time limit has passed.

It may be so arranged that the program managing apparatus has the function of sending a command to return the control program to the pre-updating program stored in the storage device of the data processing apparatus to the data processing apparatus that has a trouble with its updated control program.

In this case, the printer is provided with a function of sending a notice of the trouble with the updated program to the program managing apparatus and a function of being capable of returning to the pre-updating control program upon receipt of the command from the program managing apparatus.

As already described in connection with FIG. 9, in the digital multi-function peripheral, etc., of recent years, even when the updating of the control program in the printer section is not normally finished, a notice of such fact can readily be given by the main control unit which controls the entire apparatus to the program managing apparatus.

The present invention ensures that the program can be updated when the time has come for updating the program irrespective of the timing of updating the program, by the way that the data processing apparatus acquires the updating program data in advance and keeps it.

Therefore, the present invention can eliminate such conventional problem that in case the data processing apparatus attempts to acquire the program when the time has come for updating the program, the program updating data can not correctly be acquired due to the condition of the network or a managing server or because of the data processing apparatus being in the process of executing the printing job.

The present invention enables reduction of unnecessary power consumption as compared with the conventional method of keeping the power of the data processing apparatus turned on even after the business hours and executing the updating processing all at a time in the nighttime, by setting the updating conditions that makes the program updating timing a time zone other than the nighttime.

According to the present invention, even if the updatable period is in the time zone of the daytime, the updating processing is executed for every data processing apparatus at a predetermined interval and therefore, such situation does not happen in which all data processing apparatuses are unavailable for use due to the program updating.

By storing the program before updated in the storage device such as a hard disk, the present invention enables returning the program to the previous version, without supplying the program from the superior rank apparatus, even if a problem is occurred in the latest program.

Even when it becomes necessary to change the printer control program to its previous version in view of the usage situation of the printer drivers in the personal computers, the present invention enables easy version-down without sending such version of the program from the superior rank apparatus as the program updating data.

Since the present invention enables transferring of the program updating data sent from the program managing apparatus to the data processing apparatus to other data processing apparatus, data traffic can be reduced in the environment where a large number of data processing apparatuses are connected to the network such as the intranet or in the environment where the superior rank apparatus and the data processing apparatus are connected through the network over a long distance (Internet-connected).

The present invention enables the program managing apparatus to recognize the current version of the program used by the data processing apparatus, since the program updating completion notice is given from the data processing apparatus to the program managing apparatus.

The present invention enables an easy dealing with the data processing apparatus which does not issue the updating completion notice even after the updating time limit has passed.

The present invention enables preventing the program updating data from being repeatedly sent from the superior rank apparatus, since the data processing apparatus is provided with the function of notifying the superior rank apparatus of the information on the program stored in the storage device.

The present invention enables avoiding unnecessary usage of the storage device since, when the acquired program updating data is already stored in the storage device, the acquired data is destroyed and duplicate data is not kept.

The present invention enables preventing the memory area from being reduced by the unnecessary data since the program stored in the storage device of the data processing apparatus can automatically be deleted if its retention period has passed and can also be deleted by the request from the superior rank apparatus.

The present invention ensures that the program updating data is taken in since, even in the case of small space of memory area at the time of acquiring the program updating data, the program whose expiring date of retention comes earliest is firstly deleted based on the retention period information.

The present invention facilitates changing the timing of the updating that requires much time for the updating processing such as a major version-up to a holiday or a nighttime since the program updating timing determining conditions already set in the data processing apparatus can be specified from the program managing apparatus.

Since the present invention enables the program managing apparatus to return the control program to the version before update in the data processing apparatus that has not completed the updating of the control program, the data processing apparatus is prevented from being unavailable for use for a long time.

The invention claimed is:

1. A program managing system, comprising:

a plurality of data processing apparatuses and a program managing apparatus connected to a network, the program managing apparatus supplying control programs to the data processing apparatuses, wherein the program managing apparatus sends at least program updating data and update timing conditions to each of the data processing apparatuses, the program updating data including setting of retention periods of the control programs, and also sends requests for deleting the control programs retained in the data processing apparatuses, the program managing apparatus is provided with a control program managing portion for obtaining and saving the control programs used and retained in each of the data processing apparatuses that are sent from the data processing apparatuses, each of the data processing apparatuses, when the program updating data is sent from the program managing apparatus, saves the data in a storage device, and executes an update of the control program at a time when the respective data processing apparatus is not in operation, the respective data processing apparatus retains the control program that is not updated, saves information on the control program that the respective data processing apparatus is using and retaining, and sends the information to the program managing apparatus, each of the data processing apparatuses being configured to update the control program that is in current use, each of the data processing apparatuses being configured to delete the control program if the retention period of the control program is expired upon receiving a request for deleting the control program, each of the data processing apparatuses is provided with a control program updating portion for deleting the control program depending on its retention period when available space of the storage device is insufficient.

2. The program managing system as defined in claim 1, wherein the program updating data which the program managing apparatus sends to each of the data processing apparatuses includes a designation of the data processing apparatus to which the program updating data is transferred, and the control program updating portion of each of the data processing apparatuses has an update data transfer processing portion for transferring the received program updating data to the designated destination.

* * * * *